United States Patent
Kim et al.

(10) Patent No.: US 12,172,709 B2
(45) Date of Patent: Dec. 24, 2024

(54) FAILURE DETECTION DEVICE FOR STEERING ANGLE SENSOR, AND CONTROL METHOD THEREFOR

(71) Applicant: HL MANDO CORPORATION, Pyeongtaek (KR)

(72) Inventors: Taegyun Kim, Seongnam (KR); Seungcheol Lee, Osan (KR); Daehun Hwang, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 198 days.

(21) Appl. No.: 17/905,766

(22) PCT Filed: Mar. 5, 2021

(86) PCT No.: PCT/KR2021/002724
§ 371 (c)(1),
(2) Date: Sep. 7, 2022

(87) PCT Pub. No.: WO2021/182799
PCT Pub. Date: Sep. 16, 2021

(65) Prior Publication Data
US 2023/0112736 A1    Apr. 13, 2023

(30) Foreign Application Priority Data
Mar. 9, 2020 (KR) .................. 10-2020-0028893

(51) Int. Cl.
*B62D 5/00*      (2006.01)
*B62D 5/04*      (2006.01)
(Continued)

(52) U.S. Cl.
CPC .......... *B62D 5/049* (2013.01); *B62D 15/022* (2013.01); *G01D 5/24461* (2013.01)

(58) Field of Classification Search
CPC .. B62D 5/049; B62D 15/022; B62D 15/0245; B62D 15/0215; B62D 5/046;
(Continued)

(56) References Cited

U.S. PATENT DOCUMENTS

| | | | |
|---|---|---|---|
| 8,810,239 B2 * | 8/2014 | Shin | 324/207.22 |
| 11,953,396 B2 * | 4/2024 | Toyama | G01L 3/105 |

(Continued)

FOREIGN PATENT DOCUMENTS

| | | |
|---|---|---|
| DE | 102015115686 A1 | 3/2017 |
| DE | 102020100904 A1 | 7/2020 |

(Continued)

OTHER PUBLICATIONS

I. Dadon, N. Koren, R. Klein, J. Bortman, "A realistic dynamic model for gear fault diagnosis", Engineering Failure Analysis, vol. 84, 2018 (Year: 2018).*

(Continued)

*Primary Examiner* — Elaine Gort
*Assistant Examiner* — Brittany Renee Peko
(74) *Attorney, Agent, or Firm* — Harvest IP Law, LLP (57) ABSTRACT

A failure detection device for a steering angle sensor according to an embodiment comprises: a steering angle sensor including a main gear that rotates together with a steering wheel, a first sub-gear and a second sub-gear that are each engaged with the main gear and have a constant gear ratio with the main gear, a first Hall IC chip for detecting the angle of the first sub-gear, and a second Hall IC chip for detecting the angle of the second sub-gear; and a control unit that determines failure of the steering angle sensor on the basis of a first angle difference between the current angle and a previous angle of the first sub-gear as detected by the first Hall IC chip, and a second angle difference between the current angle and a previous angle of the second sub-gear as detected by the second Hall IC chip.

16 Claims, 7 Drawing Sheets

(51) Int. Cl.
*B62D 15/02* (2006.01)
*G01D 5/244* (2006.01)

(58) Field of Classification Search
CPC .. B62D 15/0225; G01D 5/24461; G01D 3/08;
G01D 5/04; G01D 5/145; G01D 5/142;
B60Y 2400/3012
See application file for complete search history.

(56) References Cited

U.S. PATENT DOCUMENTS

| | | | | |
|---|---|---|---|---|
| 2005/0171727 | A1* | 8/2005 | Sakabe | 702/151 |
| 2008/0249683 | A1* | 10/2008 | Wu | 701/41 |
| 2009/0105909 | A1* | 4/2009 | Yamaguchi | 701/41 |
| 2022/0396311 | A1* | 12/2022 | Hong | B62D 15/0215 |

FOREIGN PATENT DOCUMENTS

| | | |
|---|---|---|
| EP | 1471290 B1 | 3/2011 |
| JP | 2009098094 A | 5/2009 |
| JP | 2011-145225 A | 7/2011 |
| JP | 7037995 B2 | 3/2022 |
| KR | 100824027 B1 | 4/2008 |
| KR | 20150065986 A | 6/2015 |
| WO | 2017167572 A1 | 10/2017 |

OTHER PUBLICATIONS

Office Action from German Patent and Trademark Office, dated Sep. 19, 2024.

* cited by examiner

FAILURE DETECTION DEVICE FOR STEERING ANGLE SENSOR, AND CONTROL METHOD THEREFOR

CROSS-REFERENCE TO RELATED APPLICATIONS

This application is a National Stage of International Application No. PCT/KR2021/002724 filed Mar. 5, 2021, claiming priority based on Korean Patent Application No. 10-2020-0028893 filed Mar. 9, 2020.

TECHNICAL FIELD

The disclosure relates to an apparatus for detecting a failure of a steering angle sensor that detects a steering angle of a steering wheel provided in a vehicle, and a method of controlling the same.

BACKGROUND ART

In general, an electric power steering system (EPS) applied to a vehicle may include a steering angle sensor installed on a steering shaft that transmits a manipulation force in conjunction with a steering wheel manipulated by a driver to detect a rotation angle of the steering wheel, that is, a steering angle.

The steering angle sensor may include a main gear mounted on the steering shaft, first and second sub gears each meshed with the main gear while having a predetermined gear ratio with the main gear, magnets attached to the first and second sub gears, and a first Hall IC chip and a second Hall IC chip each detecting a change in a magnetic field emitted to a corresponding one of the magnets.

Outputs of the first Hall IC chip and the second Hall IC chip of the steering angle sensor may be output to an electronic control unit (ECU) of the EPS. The first Hall IC chip may output the rotation angle of the first sub gear, and the second Hall IC chip may output the rotation angle of the second sub gear.

The rotation angle of the steering shaft may be identified from the rotation angle of the first sub gear and the rotation angle of the second sub gear.

There are various methods of identifying the steering angle by combining the angle information of the two sub gears, and detecting a failure state due to a current algorithm error or noise.

The precision of the steering angle may be significantly affected by the tooth meshing of the main gear and the two sub gears. There is no technology of detecting failures caused by the amount of change in each gear during steering wheel operation. In addition to failures due to algorithm errors and noise, missing or deformation of a gear tooth may cause misalignment of meshing between the main gear and each sub gear, in which case incorrect angle information may be output every time the section is passed, so that the steering angle may be wrongly identified.

DISCLOSURE

Technical Problem

One aspect of the disclosure provides an apparatus for detecting a failure of a steering angle sensor capable of more effectively detecting a failure due to gear deformation or gear damage of the steering angle sensor, and a method of controlling the same.

Technical Solution

According to an aspect of the disclosure, there is provided an apparatus for detecting a failure of a steering angle sensor, the apparatus including: a steering wheel sensor including a main gear configured to rotate together with a steering wheel, a first sub gear and a second sub gear each of which is meshed with the main gear while having a predetermined gear ratio with the main gear, and a first Hall integrated circuit (IC) chip for detecting an angle of the first sub gear and a second Hall IC chip for detecting an angle of the second sub gear; and a controller configured to identify whether the steering angle sensor fails based on a first angle difference between the angle of the first sub gear at a current point in time and the angle of the first sub gear at a previous point in time that are detected by the first Hall IC ship, and a second angle difference between the angle of the second sub gear at the current point in time and the angle of the second sub gear at the previous point in time that are detected by the second Hall IC ship.

The controller may be configured to count a number of times that the first angle difference is greater than a preset angle, and if the counted number of times is greater than a preset number of times, identify that the steering angle sensor fails due to tooth damage of the first sub gear.

The controller may be configured to count a number of times that the second angle difference is greater than a preset angle, and if the counted number of times is greater than a preset number of times, identify that the steering angle sensor fails due to tooth damage of the second sub gear.

The controller may be configured to count a number of times that the first angle difference is greater than a preset angle, count a number of times that the second angle difference is greater than a preset angle, summate the counted numbers of times, and if a result of the summation of the counted numbers of times is greater than a preset number of times, identify that the steering angle sensor fails due to gear damage of the steering angle sensor.

The controller may be configured to identify whether the steering angle sensor fails based on the first angle difference, the second angle difference, and a first-second angle difference that may be a difference between the first angle difference and the second angle difference.

The controller may be configured to count a number of times that the first angle difference is greater than a preset angle, count a number of times that the second angle difference is greater than a preset angle, count a number of times that the first-second angle difference is greater than a preset angle, summate the counted numbers of times, and if a result of the summation of the counted numbers of times is greater than a preset number of times, identify that the steering angle sensor fails due to gear damage of the steering angle sensor.

The controller may be configured to identify whether the steering angle sensor fails based on a first-second angle difference that is a difference between the first angle difference and the second angle difference.

The controller may be configured to count a number of times that the first-second angle difference is greater than a preset angle, summate the counted numbers of times, and if a result of the summation of the counted numbers of times is greater than a preset number of times, identify that the steering angle sensor fails due to gear damage of the steering angle sensor.

According to an aspect of the disclosure, there is provided a method of controlling a steering angle sensor including a main gear configured to rotate together with a steering wheel, and a first sub gear and a second sub gear each of which is meshed with the main gear while having a predetermined gear ratio with the main gear, the method including: detecting an angle of the first sub gear; detecting an angle of the second sub gear; identifying a first angle difference between the angle of the first sub gear at a current point in time and the angle of the first sub gear at a previous point in time; identifying a second angle difference between the angle of the second sub gear at the current point in time and the angle of the second sub gear at the previous point in time; and identifying whether the steering angle sensor fails based on the first angle difference and the second angle difference.

The identifying of whether the steering angle sensor fails may include counting a number of times that the first angle difference is greater than a preset angle, and if the counted number of times is greater than a preset number of times, identifying that the steering angle sensor fails due to tooth damage of the first sub gear.

The identifying of whether the steering angle sensor fails may include counting a number of times that the second angle difference is greater than a preset angle, and if the counted number of times is greater than a preset number of times, identifying that the steering angle sensor fails due to tooth damage of the second sub gear.

The identifying of whether the steering angle sensor fails may include counting a number of times that the first angle difference is greater than a preset angle, counting a number of times that the second angle difference is greater than a preset angle, summating the counted numbers of times, and if a result of the summation of the counted numbers of times is greater than a preset number of times, identifying that the steering angle sensor fails due to gear damage of the steering angle sensor.

The method may further include identifying a first-second angle difference that is a difference between the first angle difference and the second angle difference; and identifying whether the steering angle sensor fails based on the first angle difference, the second angle difference, and the first-second angle difference.

The identifying of whether the steering angle sensor fails may include: counting a number of times that the first angle difference is greater than a preset angle; counting a number of times that the second angle difference is greater than a preset angle, counting a number of times that the first-second angle difference is greater than a preset angle, summating the counted numbers of times, and if a result of the summation of the counted numbers of times is greater than a preset number of times, identifying that the steering angle sensor fails due to gear damage of the steering angle sensor.

The identifying of whether the steering angle sensor fails may include identifying whether the steering angle sensor fails based on a first-second angle difference that is a difference between the first angle difference and the second angle difference.

The identifying of whether the steering angle sensor fails may include: counting a number of times that the first-second angle difference is greater than a preset angle; summating the counted numbers of times; and if a result of the summation of the counted numbers of times is greater than a preset number of times, identifying that the steering angle sensor fails due to gear damage of the steering angle sensor.

Advantageous Effects

According to one aspect of the disclosure, a failure due to gear deformation or gear damage of a steering angle sensor can be more effectively detected.

MODES OF THE INVENTION

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

In addition, it will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component. As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Figure 1:
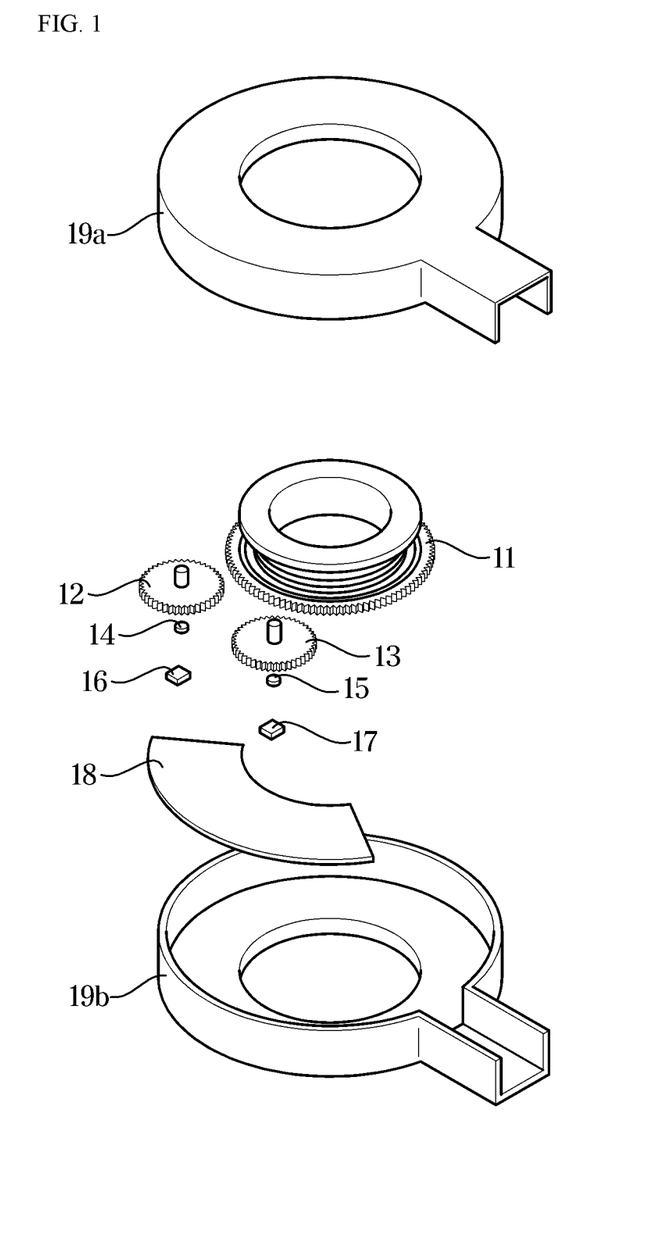
FIG. 1 illustrates a steering angle sensor applied to an apparatus for detecting a failure of a steering angle sensor according to an embodiment.
Figure 2:
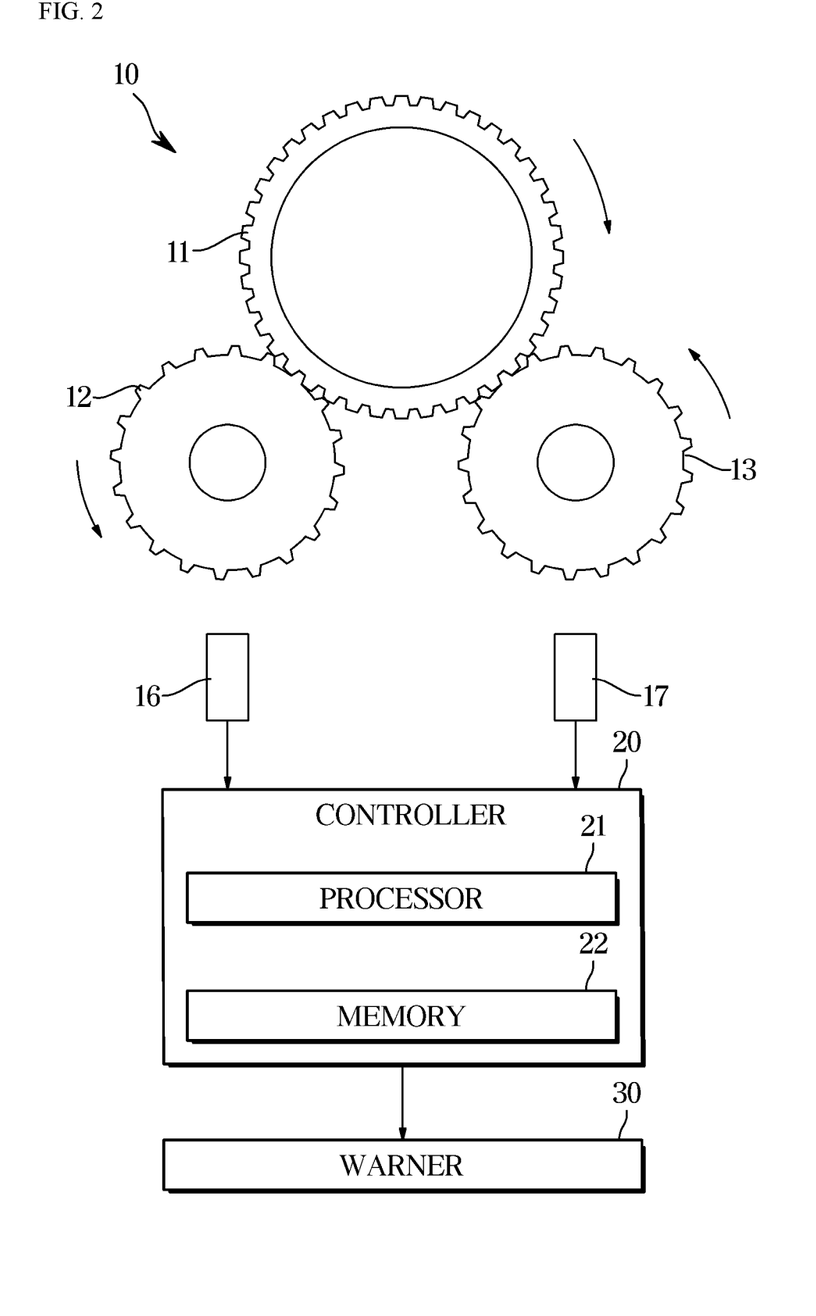
FIG. 2 illustrates a control block of an apparatus for detecting a failure of a steering angle sensor according to an embodiment.

FIG. 1 illustrates a steering angle sensor applied to an apparatus for detecting a failure of a steering angle sensor according to an embodiment, and FIG. 2 illustrates a control block of an apparatus for detecting a failure of a steering angle sensor according to an embodiment.

Referring to FIGS. 1 and 2, an apparatus for detecting a steering angle sensor may include a steering angle sensor 10, a controller 20, and a warner 30.

The steering angle sensor 10 may include a main gear 11 mounted on a steering shaft, a first sub gear 12 and a second sub gear 13 each meshed with the main gear 11 while having a predetermined gear ratio with the main gear 11, a first magnet 14 attached to the first sub gear 12, a second magnet 15 attached to the second sub gear 13, a first Hall IC chip 16 and a second Hall IC chip 17 for detecting changes in magnetic fields emitted from the first and second magnets 14 and 15, respectively, a printed circuit board 18 on which the first Hall IC chip 16 and the second Hall IC chip 17 are mounted, and an upper cover 19a and a lower cover 19b surrounding the above described components The main gear 11 may have n teeth.

The number of teeth of the two sub gears 12 and 13 may be less than the number of teeth of the main gear 11.

The first sub gear 12 and the second sub gear 13 may have teeth in different numbers. For example, the first sub gear 12 may have m teeth, and the second sub gear 13 may have m+1 teeth.

The printed circuit board 18 may be electrically connected to an electronic control unit (ECU) of an electric power steering system (EPS) through a connector electrically connected to a wiring pattern formed on the printed circuit board 18.

The main gear 11 and the two sub gears 12 and 13 are meshed with each other.

When the main gear 11 rotates, the two sub gears 12 and 13 may rotate.

Since the main gear 11 and the two sub gears 12 and 13 have different numbers of teeth, the rotation angles of the main gear 11 and the two sub gears 12 and 13 may be different from each other when the respective gears rotate.

When the main gear 11 rotates once, the two sub gears 12 and 13 may rotate a plurality of times.

The first Hall IC chip 16 may generate a voltage signal, which is an angular function of the first sub gear 12, by the magnetic field emitted from the first magnet 14.

The second Hall IC chip 17 may generate a voltage signal, which is an angular function of the second sub gear 13, by the magnetic field emitted from the second magnet 15.

A voltage change may be repeated whenever the first sub gear 12 and the second sub gear 13 rotate once.

The controller 20 may be referred to as an electronic control unit (ECU).

The controller 20 may include a processor 21 and a memory 22.

The memory 22 may store a program for processing or controlling of the processor 21, and various types of data related to identification of the steering angle and failure identification of the steering angle sensor 10.

The memory 22 may include not only volatile memories, such as an S-RAM, and a D-RAM, but also non-volatile memories, such as a flash memory, a read only memory (ROM), an erasable programmable read only memory (EPROM), and the like.

The processor 21 may control an overall operation for identifying a failure of the steering angle sensor 10.

The controller 20 having the above configuration may be electrically connected to the printed circuit board 18 and receive angle information of each of the gears 12 and 13 from the first Hall IC chip 16 and the second Hall IC chip 17.

As the driver rotates the steering wheel, the main gear 11 mounted on the steering shaft rotates in association with the rotation of the steering wheel, the rotation of the main gear 11 causes the two sub gears 12 and 13 to be rotated together with each other.

In this state, the controller 20 may receive an angle signal output by the first Hall IC chip 16 in response to the rotation of the first sub gear 12 and an angle signal output by the second Hall IC chip 17 in response to the rotation of the second sub gear 13, and estimate the angle of the main gear 2 from the received each angle signal, to thereby identify the steering angle. In a case in which the controller 20 estimates the angle of the main gear 11, the number n of the teeth of the main gear 11, the number m of the teeth of the first sub gear 12, and the number m+1 of the teeth of the second sub gear 13 may be used.

In addition, the controller 20 may identify whether the steering angle sensor 10 fails due to a damage to each gear 11, 12, and 13 based on a first sub gear angle signal output from the first Hall IC chip 16 and a second sub gear angle signal output from the second Hall IC chip 17.

The controller 20 may warn the driver of a failure of the steering angle sensor 10 through the warner 30.

The warner 30 may include a speaker display module that outputs a message informing the driver of a failure of the steering angle sensor 10 according to a control signal of the controller 20.

Figure 3:
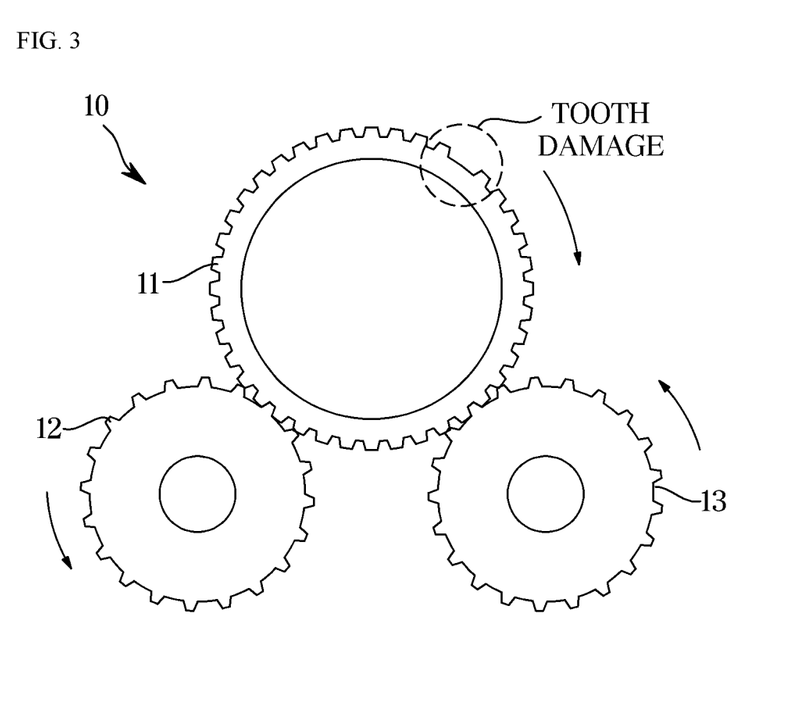
FIG. 3 illustrates meshing between a main gear and two sub gears when a tooth of the main gear is damaged in an apparatus for detecting a failure of a steering angle sensor according to an embodiment.

FIG. 3 illustrates meshing between a main gear and two sub gears when a tooth of the main gear is damaged in an apparatus for detecting a failure of a steering angle sensor according to an embodiment.

In FIG. 3, the main gear 11 with some teeth damaged and lost is illustrated.

In this case, when the two sub gears 12 and 13 are rotated in engagement with the damaged tooth portion of the main gear 11, a tooth jumping phenomenon may occur. Accordingly, an abnormal displacement of the steering angle may occur. That is, during a steering in a specific direction, erroneous sensing information or mechanical failure may allow the steering angle to change in an amount that exceeds an allowable range. This may cause unintentional control of the EPS.

In addition, tooth damage or missing of the two sub gears 12 and 13 also may allow the steering angle to change in an amount that exceeds an allowable range.

Accordingly, there is a need to detect a failure due to gear deformation or damage of the steering angle sensor in preparation for the above.

The controller 20 may identify a first sub gear angle difference between a first sub gear angle of the first sub gear 12 at the current point in time and a first sub gear angle of the first sub gear 12 at the previous point in time.

The controller 20 may identify a second sub gear angle difference between a second sub gear angle of the second sub gear 13 at the current point in time and a second sub gear angle of the second sub gear 13 at the previous point in time.

The controller 20 may identify whether the steering angle sensor 10 fails based on the first sub gear angle difference and the second sub gear angle difference.

The controller 20 may, if the first sub gear angle difference is greater than a preset angle or the second sub gear angle difference is greater than a preset angle, identify that the steering angle sensor 10 is likely to fail.

The controller 20 may, if the first sub gear angle difference is greater than the preset angle, increment a failure flag, and if the second sub gear angle difference is greater than the preset angle, increment a failure flag, and in response to the incremented failure flag being higher than a preset value, identify that the steering angle sensor 10 fails. In this case, the controller 20 may identify that the steering angle sensor 10 has a failure due to gear damage.

On the other hand, the controller 20 may identify an angle difference between the first sub gear angle difference and the second sub gear angle difference, and if the identified angle difference is higher than a preset angle, identify that the steering angle sensor 10 is likely to fail.

The controller 20 may count the number of times that the first angle difference is greater than a preset angle (a first preset value), count the number of times that the second angle difference is greater than a preset angle (a second preset value), count the number of times that the angle difference between the first sub gear angle difference and the second sub gear angle difference is greater than a preset angle (a third preset value), summate the counted numbers of times, and if a result of the summation of the counted numbers of times is greater than a preset number of times, identify that the steering angle sensor 10 fails due to gear damage. In this case, the preset first value, the preset second value, and the preset third value may be the same as or different from each other.

Figure 4:
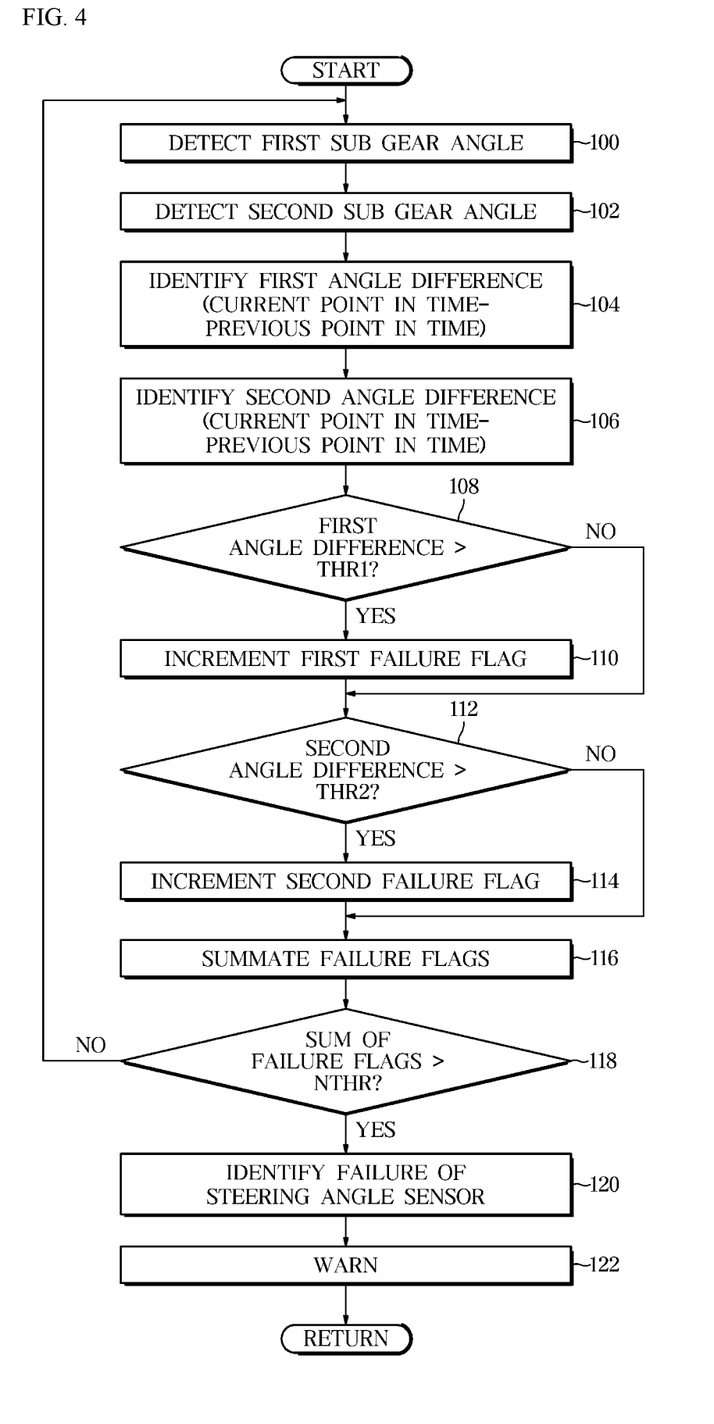
FIG. 4 illustrates a method of controlling an apparatus for detecting a failure of a steering angle sensor according to an embodiment.

FIG. 4 illustrates a method of controlling an apparatus for detecting a failure of a steering angle sensor according to an embodiment.

Referring to FIG. 4, the controller 20 may detect the angle of the first sub gear 12 by receiving an angle signal of the first sub gear 12 from the first Hall IC chip 16 of the steering angle sensor 10 (100).

The controller 20 may detect the angle of the second sub gear 13 by receiving an angle signal of the second sub gear 13 from the second Hall IC chip 17 of the steering angle sensor 10 (102).

The controller 20 may identify a first angle difference between the angle of the first sub gear 12 at the current point in time and the angle of the first sub gear 12 at the previous point in time (104).

The controller 20 may identify a second angle difference between the angle of the second sub gear 13 at the current point in time and the angle of the second sub gear 13 at the previous point in time (106).

The controller 20 may identify whether the first angle difference exceeds a preset first angle Thr1 (108).

If a result of the identification of the operation mode 108 is that the first angle difference exceeds the preset first angle Thr1, the controller 20 may increment a first failure flag (110). The first failure flag may indicate that there is a possibility of tooth damage or missing of the first sub gear 12.

On the other hand, if a result of the identification of the operation mode 108 is that the first angle difference does not exceed the preset first angle Thr1, or after the first failure flag is incremented, the controller 20 may identify whether the second angle difference exceeds a preset second angle Thr2 (112).

If a result of the identification of the operation mode 112 is that the second angle difference exceeds the preset second angle Thr2, the controller 20 may increment a second failure flag (114). The second failure flag may indicate that there is a possibility of tooth damage or missing of the second sub gear 13.

On the other hand, if a result of the identification of the operation mode 112 is that the second angle difference does not exceed the preset second angle Thr2, or after the second failure flag is incremented, the controller 20 may summate the failure flags (116). In this case, the controller 20 may separately summate the first failure flags and the second failure flags, or may summate the first failure flags and the second failure flags together.

The controller 20 may identify whether the sum of the failure flags exceed a preset value Nthr (118).

If a result of the identification of the operation 118 is that the sum of the failure flags does not exceed the preset value Nthr, the controller 20 may return to operation mode 100 and perform the subsequent operations.

On the other hand, if a result of the identification of the operation mode 118 is that the sum of the failure flags exceeds the preset value Nthr, the controller 20 may identify that the steering angle sensor 10 fails (120). In this case, if the sum of the first failure flags exceeds the preset first value, the controller 20 may identify that the steering angle sensor 10 fails due to tooth damage or missing of the first sub gear 12. In addition, if the sum of the second failure flags exceeds the preset second value, the controller 20 may identify that the steering angle sensor 10 fails due to tooth damage or missing of the second sub gear 13.

The controller 20 may warn the driver that the steering angle sensor 10 fails through the warner 30 (122).

Figure 5:
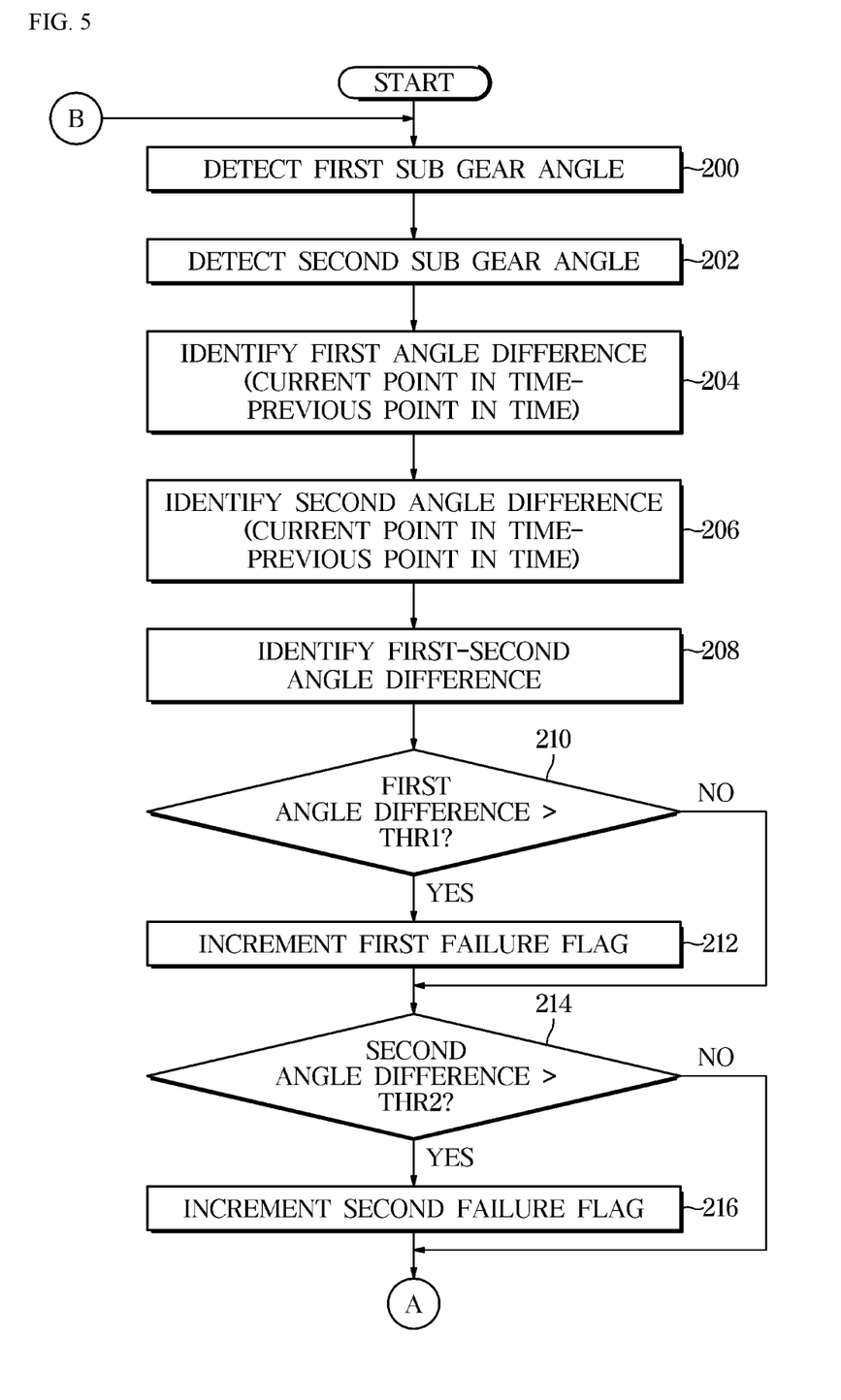
FIGS. 5 and 6 illustrate a method of controlling an apparatus for detecting a failure of a steering angle sensor according to another embodiment.
Figure 6:
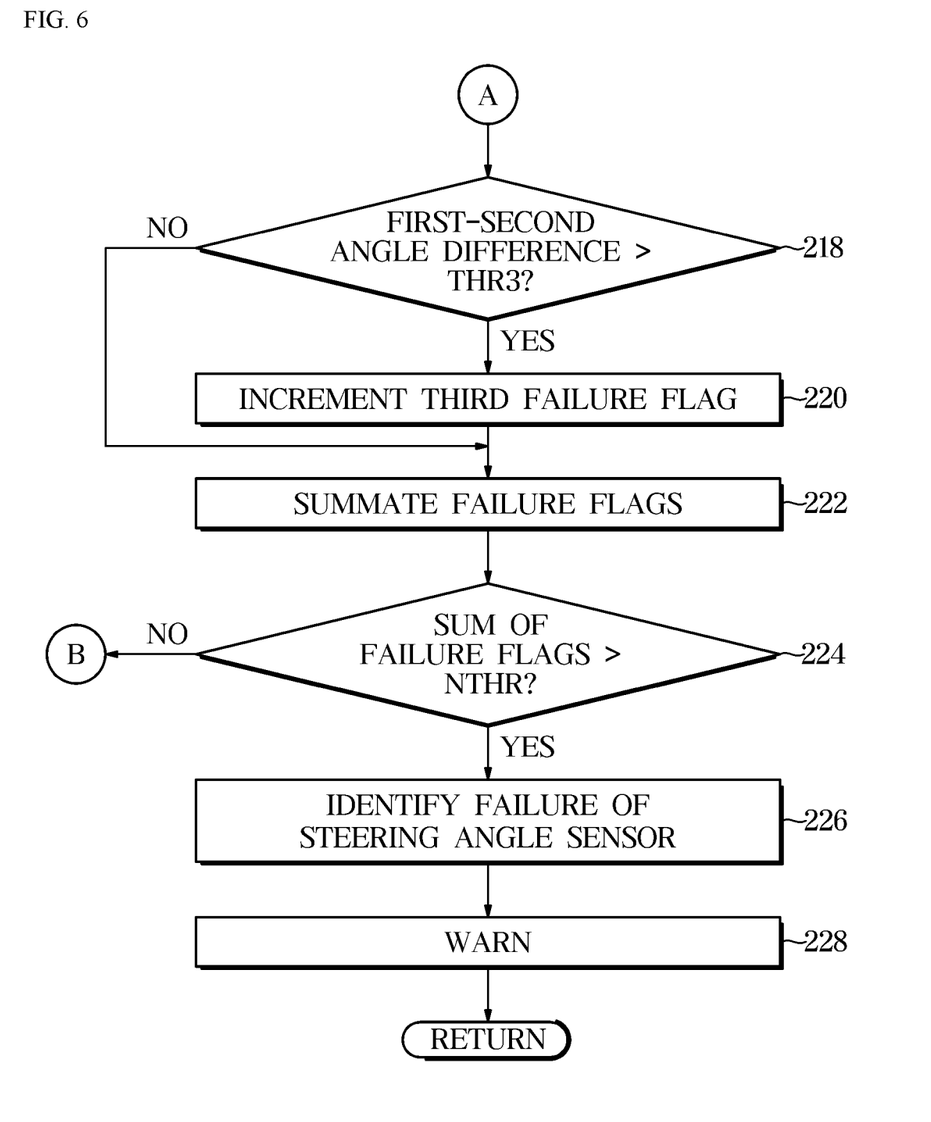

FIGS. 5 and 6 illustrate a method of controlling an apparatus for detecting a failure of a steering angle sensor according to another embodiment.

Referring to FIGS. 5 and 6, the controller 20 may detect the angle of the first sub gear 12 by receiving an angle signal of the first sub gear 12 from the first Hall IC chip 16 of the steering angle sensor 10 (200).

The controller 20 may detect the angle of the second sub gear 13 by receiving an angle signal of the second sub gear 13 from the second Hall IC chip 17 of the steering angle sensor 10 (202).

The controller 20 may identify a first angle difference between the angle of the first sub gear 12 at the current point in time and the angle of the first sub gear 12 at the previous point in time (204).

The controller 20 may identify a second angle difference between the angle of the second sub gear 13 at the current point in time and the angle of the second sub gear 13 at the previous point in time (206)

The controller 20 may identify a first-second angle difference that is an angle difference between the first angle difference and the second angle difference (208).

The controller 20 may identify whether the first angle difference exceeds a preset first angle Thr1 (210).

If a result of the identification of the operation mode 210 is that the first angle difference exceeds the preset first angle Thr1, the controller 20 may increment a first failure flag (212). The first failure flag may indicate that there is a possibility of tooth damage or missing of the first sub gear 12.

On the other hand, if a result of the identification of the operation mode 210 is that the first angle difference does not exceed the preset first angle Thr1, or after the first failure flag is incremented, the controller 20 may identify whether the second angle difference exceeds a preset second angle Thr2 (214).

If a result of the identification of the operation mode 214 is that the second angle difference exceeds the preset second angle Thr2, the controller 20 may increment a second failure flag (216). The second failure flag may indicate that there is a possibility of tooth damage or missing of the second sub gear 13.

On the other hand, if a result of the identification of the operation mode 214 is that the second angle difference does not exceed the preset first angle Thr2, or after the second failure flag is incremented, the controller 20 may identify whether the first-second angle difference exceeds a preset third angle Thr3 (218).

If a result of the identification of the operation mode 218 is that the first-second angle difference exceeds the preset third angle Thr3, the controller 20 may increment a third failure flag (220). The third failure flag may indicate that there is a possibility of tooth damage or missing of the main gear 11. The third failure flag may indicate that there is a possibility of tooth damage or missing of the first sub gear 12 or/and the second sub gear 13.

On the other hand, if a result of the identification of the operation 218 is that the first-second angle difference does not exceed the preset third angle Thr3, or after the third failure flag is incremented, the controller 20 may summate the failure flags (222). In this case, the controller 20 may separately summate the first failure flags, the second failure flags, and the third failure flags, or may summate the first failure flags, the second failure flags, and the third failure flags together.

The controller 20 may identify whether the sum of the failure flags exceeds a preset value Nthr (224).

If a result of the identification of the operation 224 is that the sum of the failure flags does not exceed the preset value Nthr, the controller 20 may return to operation 200 and perform the subsequent operations.

On the other hand, if a result of the identification of the operation mode 224 is that the sum of the failure flags exceeds the preset value Nthr, the controller 20 may identify that the steering angle sensor 10 fails (226). In this case, if the sum of the first failure flags exceeds the preset first value, the controller 20 may identify that the steering angle sensor 10 fails due to tooth damage or missing of the first sub gear 12. In addition, when the sum of the second failure flags exceeds the preset second value, the controller 20 may identify that the steering angle sensor 10 fails due to tooth damage or missing of the second sub gear 13, or may also identify that the steering angle sensor 10 fails due to tooth damage or missing of the main gear 11.

The controller 20 may warn the driver that the steering angle sensor 10 fails through the warner 30 (228).

Figure 7:
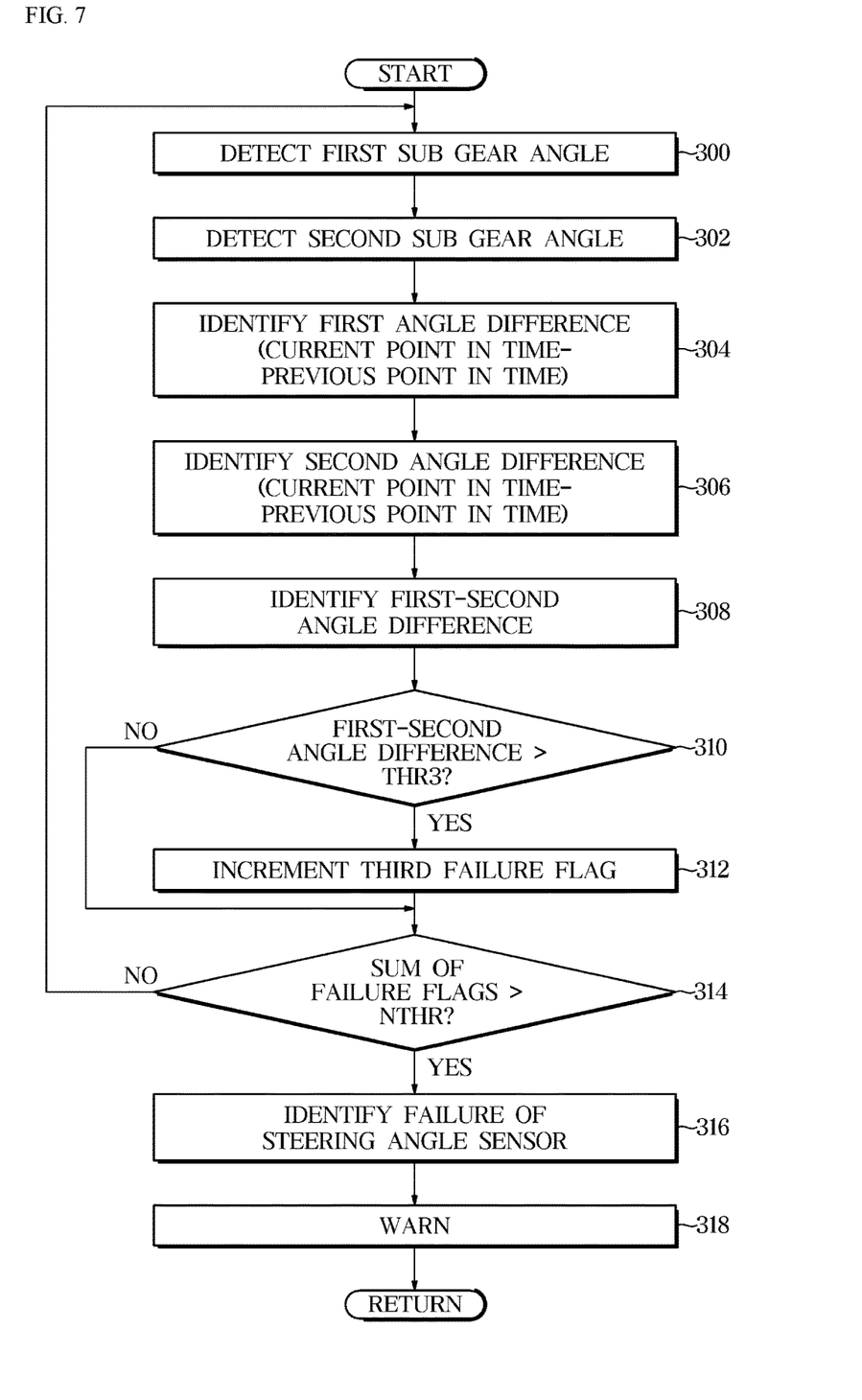
FIG. 7 illustrates a method of controlling an apparatus for detecting a failure of a steering angle sensor according to still another embodiment.

FIG. 7 illustrates a method of controlling an apparatus for detecting a failure of a steering angle sensor according to still another embodiment.

Referring to FIG. 7, the controller 20 may detect the angle of the first sub gear 12 by receiving an angle signal of the first sub gear 12 from the first Hall IC chip 16 of the steering angle sensor 10 (300).

The controller 20 may detect the angle of the second sub gear 13 by receiving an angle signal of the second sub gear 13 from the second Hall IC chip 17 of the steering angle sensor 10 (302).

The controller 20 may identify a first angle difference between the angle of the first sub gear 12 at the current point in time and the angle of the first sub gear 12 at the previous point in time (304).

The controller 20 may identify a second angle difference between the angle of the second sub gear 13 at the current point in time and the angle of the second sub gear 13 at the previous point in time (306).

The controller 20 may identify a first-second angle difference that is an angle difference between the first angle difference and the second angle difference (308).

The controller 20 may identify whether the first-second angle difference exceeds a preset third angle Thr3 (310).

If a result of the identification of the operation mode 310 is that the first-second angle difference exceeds the preset third angle Thr3, the controller 20 may increment a failure flag (312). The failure flag may indicate that there is a possibility of tooth damage or missing of the main gear 11. The failure flag may indicate that there is a possibility of tooth damage or missing of the first sub gear 12 or/and the second sub gear 13.

On the other hand, if a result of the identification of the operation 310 is that the first-second angle difference does not exceed the preset third angle Thr3, or after the failure flag is incremented, the controller 20 may identify that the sum of the failure flags exceeds a preset value Nthr (314).

If a result of the identification of the operation mode 314 is that the sum of the failure flags does not exceed the preset value Nthr, the controller 20 may return to operation 300 and perform the subsequent operation (316).

On the other hand, a result of the identification of the operation mode 314 is that the sum of the failure flags exceeds the preset value Nthr, the controller 20 may identify that the steering angle sensor 10 fails (316).

The controller 20 may warn the driver that the steering angle sensor 10 fails through the warner 30 (318).

As described above, the present disclosure may more effectively detect a failure due to gear deformation or damage of the steering angle sensor.

The invention claimed is:

1. An apparatus for detecting a failure of a steering angle sensor, the apparatus comprising:
 a steering wheel sensor including a main gear configured to rotate together with a steering wheel, a first sub gear and a second sub gear each of which is meshed with the main gear while having a predetermined gear ratio with the main gear, and a first Hall integrated circuit (IC) chip for detecting an angle of the first sub gear and a second Hall IC chip for detecting an angle of the second sub gear; and
 a controller configured to identify whether the steering angle sensor fails based on a first angle difference between the angle of the first sub gear at a current point in time and the angle of the first sub gear at a previous point in time that are detected by the first Hall IC chip, and a second angle difference between the angle of the second sub gear at the current point in time and the angle of the second sub gear at the previous point in time that are detected by the second Hall IC chip,
 wherein the controller is configured to count a number of times that the first angle difference is greater than a preset angle and identify that the steering angle sensor fails due to tooth damage of the first sub gear based on the counted number of times.

2. The apparatus of claim 1, wherein the controller is configured to, if the counted number of times is greater than a preset number of times, identify that the steering angle sensor fails due to tooth damage of the first sub gear.

3. The apparatus of claim 1, wherein the controller is configured to count a number of times that the second angle difference is greater than a preset angle, and if the counted number of times is greater than a preset number of times, identify that the steering angle sensor fails due to tooth damage of the second sub gear.

4. The apparatus of claim 1, wherein the controller is configured to count a number of times that the second angle difference is greater than a preset angle, summate the counted numbers of times, and if a result of the summation of the counted numbers of times is greater than a preset number of times, identify that the steering angle sensor fails due to gear damage of the steering angle sensor.

5. The apparatus of claim 1, wherein the controller is configured to identify whether the steering angle sensor fails based on the first angle difference, the second angle difference, and a first-second angle difference that is a difference between the first angle difference and the second angle difference.

6. The apparatus of claim 5, wherein the controller is configured to count a number of times that the second angle difference is greater than a preset angle, count a number of times that the first-second angle difference is greater than a preset angle, summate the counted numbers of times, and if a result of the summation of the counted numbers of times is greater than a preset number of times, identify that the steering angle sensor fails due to gear damage of the steering angle sensor.

7. The apparatus of claim 1, wherein the controller is configured to identify whether the steering angle sensor fails based on a first-second angle difference that is a difference between the first angle difference and the second angle difference.

8. The apparatus of claim 7, wherein the controller is configured to count a number of times that the first-second angle difference is greater than a preset angle, summate the counted numbers of times, and if a result of the summation of the counted numbers of times is greater than a preset number of times, identify that the steering angle sensor fails due to gear damage of the steering angle sensor.

9. A method of controlling a steering angle sensor including a main gear configured to rotate together with a steering wheel, and a first sub gear and a second sub gear each of which is meshed with the main gear while having a predetermined gear ratio with the main gear, the method comprising:
    detecting an angle of the first sub gear;
    detecting an angle of the second sub gear;
    identifying a first angle difference between the angle of the first sub gear at a current point in time and the angle of the first sub gear at a previous point in time;
    identifying a second angle difference between the angle of the second sub gear at the current point in time and the angle of the second sub gear at the previous point in time; and
    identifying whether the steering angle sensor fails based on the first angle difference and the second angle difference,
    wherein identifying whether the steering angle sensor fails comprising counting a number of times that the first angle difference is greater than a preset angle and identifying that the steering angle sensor fails due to tooth damage of the first sub gear based on the counted number of times.

10. The method of claim 9, wherein the identifying of whether the steering angle sensor fails includes
    if the counted number of times is greater than a preset number of times, identifying that the steering angle sensor fails due to tooth damage of the first sub gear.

11. The method of claim 9, wherein the identifying of whether the steering angle sensor fails includes
    counting a number of times that the second angle difference is greater than a preset angle, and if the counted number of times is greater than a preset number of times, identifying that the steering angle sensor fails due to tooth damage of the second sub gear.

12. The method of claim 9, wherein the identifying of whether the steering angle sensor fails includes
    counting a number of times that the second angle difference is greater than a preset angle, summating the counted numbers of times, and if a result of the summation of the counted numbers of times is greater than a preset number of times, identifying that the steering angle sensor fails due to gear damage of the steering angle sensor.

13. The method of claim 9, further comprising identifying a first-second angle difference that is a difference between the first angle difference and the second angle difference; and
    identifying whether the steering angle sensor fails based on the first angle difference, the second angle difference, and the first-second angle difference.

14. The method of claim 13, wherein the identifying of whether the steering angle sensor fails includes:
    counting a number of times that the second angle difference is greater than a preset angle, counting a number of times that the first-second angle difference is greater than a preset angle, summating the counted numbers of times, and if a result of the summation of the counted numbers of times is greater than a preset number of times, identifying that the steering angle sensor fails due to gear damage of the steering angle sensor.

15. The method of claim 9, wherein the identifying of whether the steering angle sensor fails includes
    identifying whether the steering angle sensor fails based on a first-second angle difference that is a difference between the first angle difference and the second angle difference.

16. The method of claim 15, wherein the identifying of whether the steering angle sensor fails includes:
    counting a number of times that the first-second angle difference is greater than a preset angle; summating the counted numbers of times; and if a result of the summation of the counted numbers of times is greater than a preset number of times, identifying that the steering angle sensor fails due to gear damage of the steering angle sensor.

* * * * *